United States Patent
Kang et al.

(10) Patent No.: US 12,020,065 B2
(45) Date of Patent: Jun. 25, 2024

(54) HIERARCHICAL PROCESSOR SELECTION

(71) Applicant: SAMSUNG ELECTRONICS CO., LTD., Suwon-si (KR)

(72) Inventors: Hyun-Ju Kang, Gyeongsangbuk-Do (KR); Sang-Kyu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 17/204,565

(22) Filed: Mar. 17, 2021

(65) Prior Publication Data

US 2021/0200584 A1 Jul. 1, 2021

Related U.S. Application Data

(63) Continuation of application No. 16/245,603, filed on Jan. 11, 2019, now Pat. No. 10,956,210.

(30) Foreign Application Priority Data

Jun. 5, 2018 (KR) ........................ 10-2018-0064711

(51) Int. Cl.
*G06F 9/48* (2006.01)
*G06F 9/50* (2006.01)
*G06F 15/80* (2006.01)

(52) U.S. Cl.
CPC ............ *G06F 9/4881* (2013.01); *G06F 9/505* (2013.01); *G06F 15/80* (2013.01)

(58) Field of Classification Search
CPC ......... G06F 9/4881; G06F 9/505; G06F 15/80
See application file for complete search history.

(56) References Cited

U.S. PATENT DOCUMENTS

| | | |
|---|---|---|
| 6,321,133 B1 | 11/2001 | Smirnov et al. |
| 7,299,371 B2 | 11/2007 | Day et al. |
| 7,761,876 B2 | 7/2010 | Oliveira |
| 7,996,346 B2 | 8/2011 | Bell, Jr. et al. |
| 8,078,824 B2 | 12/2011 | Sugumar et al. |
| 8,463,971 B2 | 6/2013 | Solomita et al. |

(Continued)

FOREIGN PATENT DOCUMENTS

| | | |
|---|---|---|
| CN | 104995603 A | 10/2015 |
| CN | 105487919 A | 4/2016 |

OTHER PUBLICATIONS

Office Action dated Jan. 23, 2024 in corresponding Chinese Patent Application No. 201910337547.3, 13 pages, In Chinese.

*Primary Examiner* — Jacob D Dascomb
(74) *Attorney, Agent, or Firm* — F. CHAU & ASSOCIATES, LLC

(57) ABSTRACT

A multi-processor system includes a plurality of processors, a scheduler, and a selector. Each of the plurality of processors is included in at least one of a plurality of domains. The plurality of domains include three or more domains and are defined based on a hierarchical domain structure. The scheduler receives and manages at least one task performed by the plurality of processors. The selector selects one of the plurality of domains based on states of the plurality of domains to assign the at least one task to the selected domain, and selects at least one processor among processors in the selected domain based on states of the processors in the selected domain to assign the at least one task to the selected processor, when the at least one task is received.

20 Claims, 17 Drawing Sheets

(56) References Cited

U.S. PATENT DOCUMENTS

| | | |
|---|---|---|
| 8,539,494 B2 | 9/2013 | Saxe et al. |
| 9,009,512 B2 | 4/2015 | Henry et al. |
| 9,235,447 B2 | 1/2016 | Singh et al. |
| 9,594,560 B2 | 3/2017 | Ananthakrishnan et al. |
| 9,619,282 B2 | 4/2017 | Davis et al. |
| 9,710,309 B2 | 7/2017 | Davis et al. |
| 9,753,771 B2 | 9/2017 | Lee et al. |
| 9,785,481 B2 | 10/2017 | Muckle et al. |
| 2006/0070031 A1* | 3/2006 | Szyperski ............... G06F 9/54 717/120 |
| 2010/0082497 A1 | 4/2010 | Biesemann et al. |
| 2011/0276812 A1* | 11/2011 | Lee .................. G06F 1/3203 713/300 |
| 2012/0278637 A1 | 11/2012 | Hsin et al. |
| 2013/0212594 A1 | 8/2013 | Choi et al. |
| 2013/0339977 A1 | 12/2013 | Dennis et al. |
| 2015/0242245 A1 | 8/2015 | Brown et al. |
| 2015/0324234 A1 | 11/2015 | Chang et al. |
| 2016/0098472 A1* | 4/2016 | Appleton ............... G06F 16/27 707/737 |
| 2016/0139964 A1 | 5/2016 | Chen et al. |
| 2016/0248726 A1* | 8/2016 | Kolesnik ............ H04L 61/5007 |
| 2018/0018614 A1 | 1/2018 | Vajracharya et al. |
| 2018/0074857 A1 | 3/2018 | Chang et al. |
| 2018/0150326 A1* | 5/2018 | Xia ................... G06F 9/3891 |
| 2019/0370060 A1 | 12/2019 | Kang et al. |
| 2020/0159574 A1* | 5/2020 | Jagadeesh ............ G06F 9/4881 |

\* cited by examiner

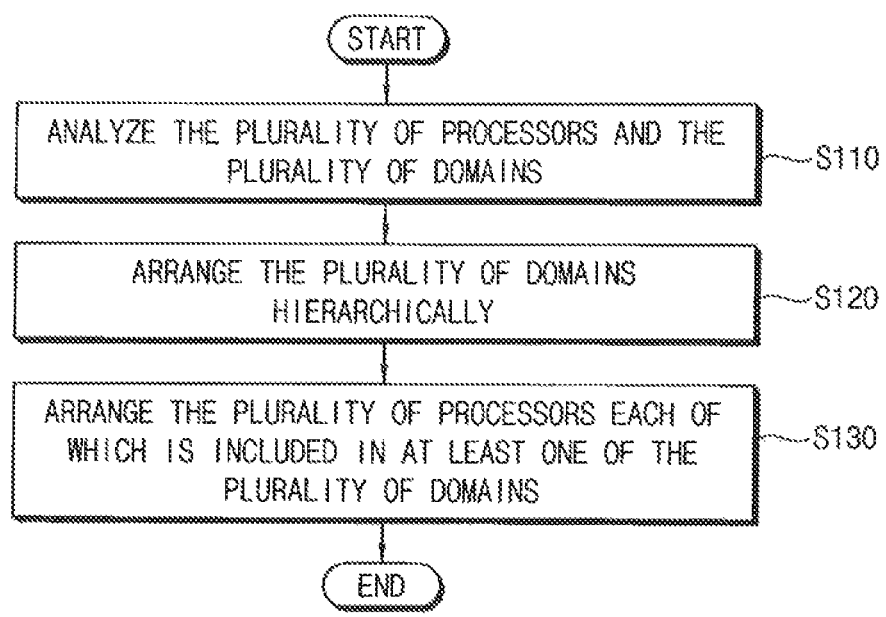

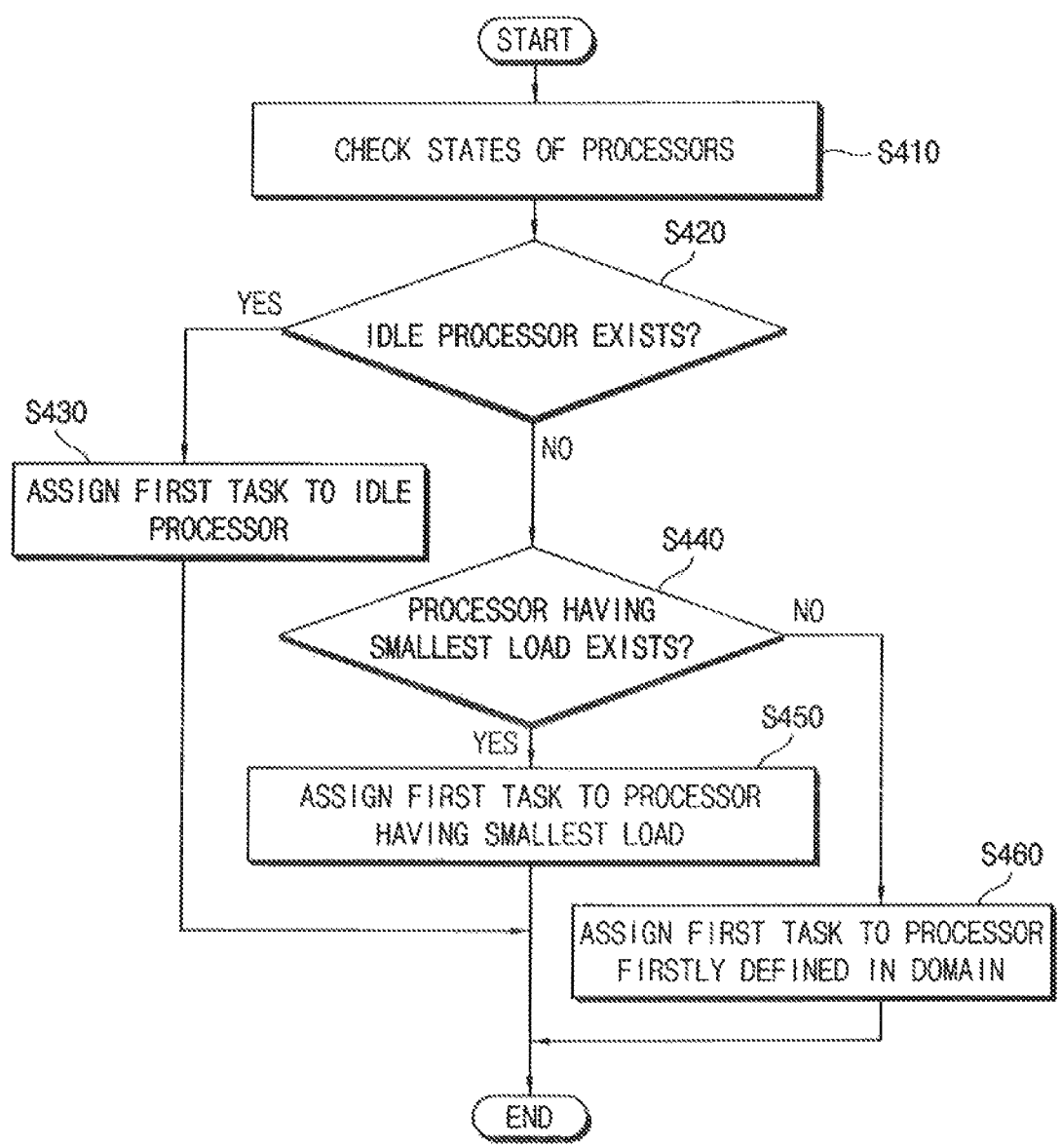

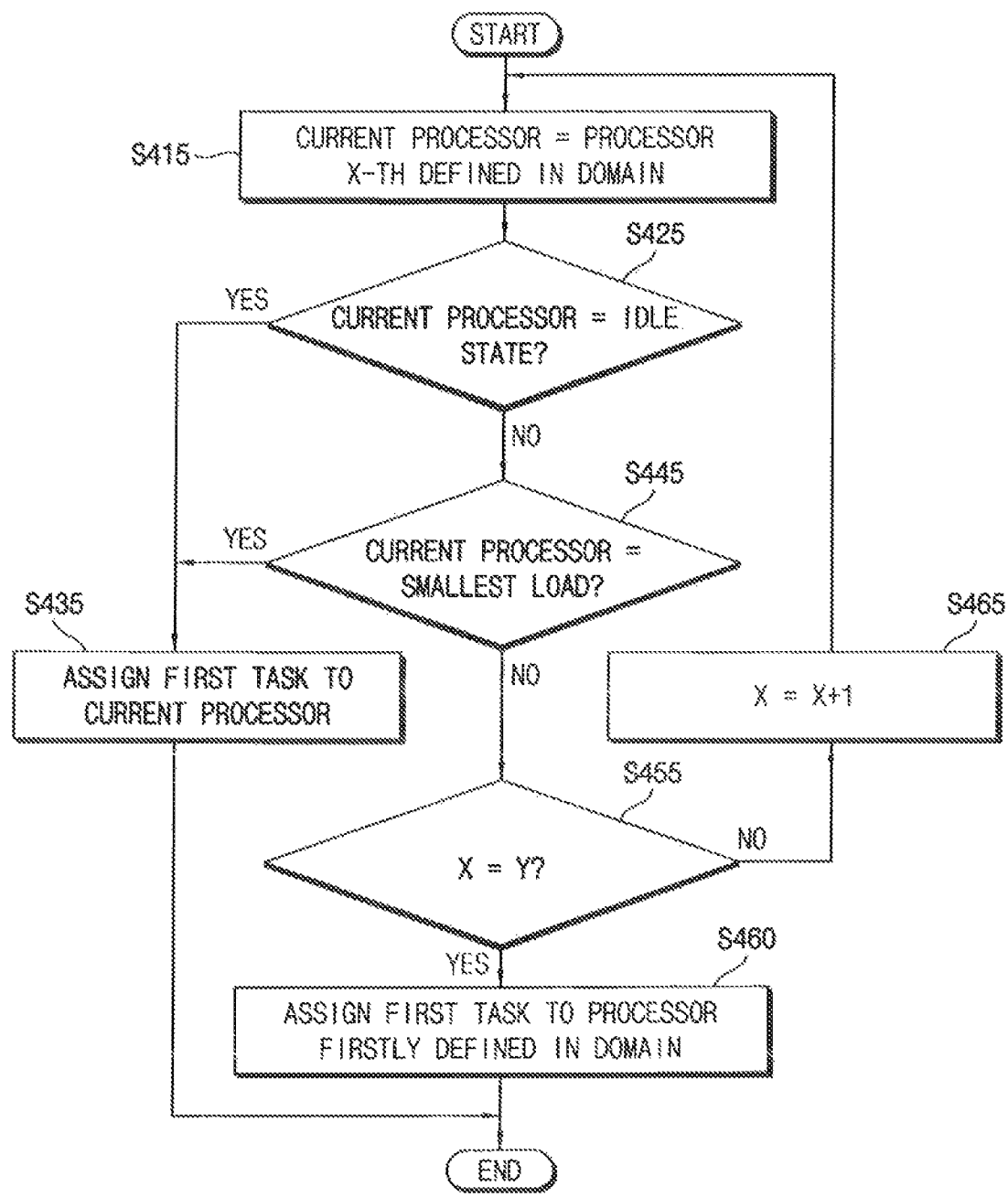

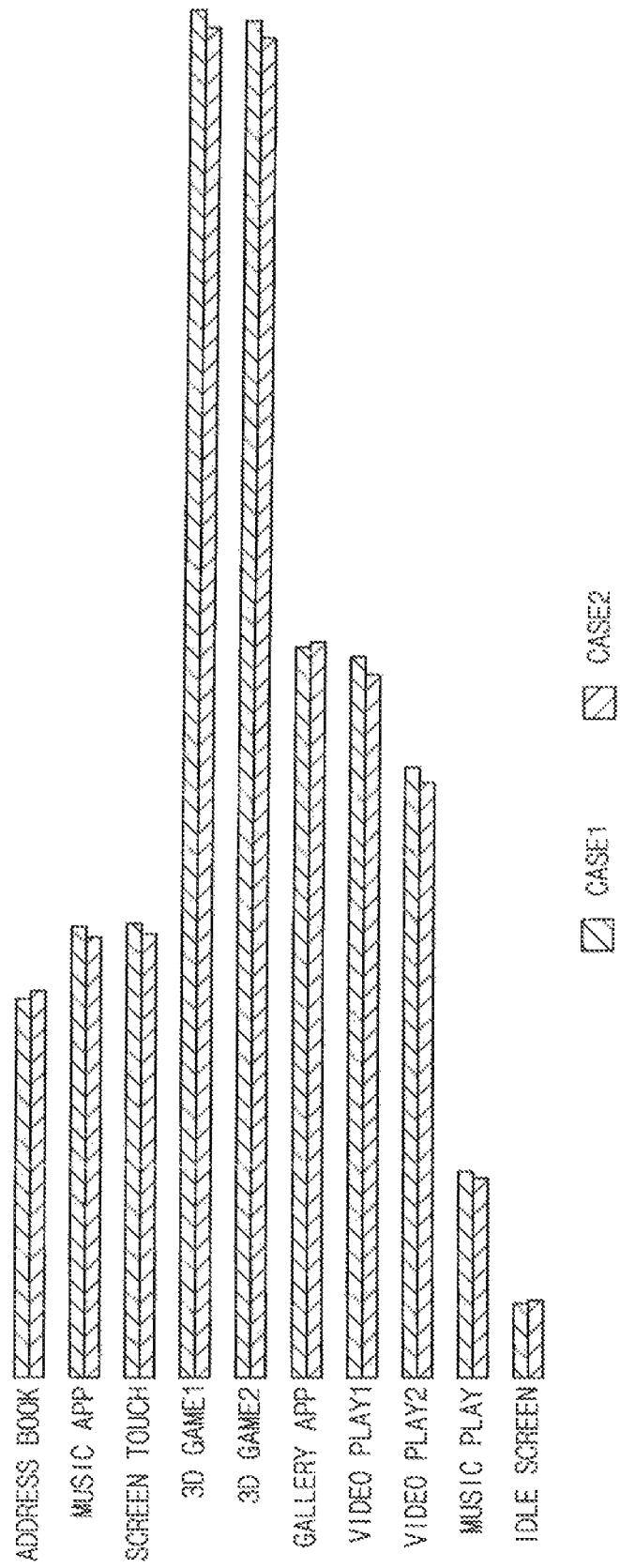

HIERARCHICAL PROCESSOR SELECTION

CROSS-REFERENCE TO RELATED APPLICATION

This application claims priority under 35 U.S.C. § 119 to Korean Patent Application No. 10-2018-0064711, filed on Jun. 5, 2018 in the Korean Intellectual Property Office (KIPO) and U.S. patent application Ser. No. 16/245,603 filed on Jan. 11, 2019, the disclosures of which are incorporated by reference herein in their entirety.

TECHNICAL FIELD

Exemplary embodiments of the inventive concept relate generally to computing systems, and more particularly, to multi-processor systems including a plurality processors, multi-core processing devices including a plurality of processor cores, and methods of operating the multi-processor systems.

DISCUSSION OF RELATED ART

An operating system (OS) executed by a computing system manages all hardware resources and software resources in the computing system. To perform or complete a series of tasks, the OS manages the processing order of tasks and resources required for the tasks, and a processor such as a central processing unit (CPU) performs most of the tasks. Recently, to enhance or improve performance, computing systems including a plurality of processors or processor cores have been developed, and researchers are conducting various research projects on techniques of optimizing performance and power consumption of the plurality of processors or processor cores included in the computing systems.

SUMMARY

According to an exemplary embodiment of the inventive concept, a multi-processor system includes a plurality of processors, a scheduler, and a selector. Each of the plurality of processors is included in at least one of a plurality of domains. The plurality of domains includes three or more domains and are defined based on a hierarchical domain structure. The scheduler receives and manages at least one task performed by the plurality of processors. The selector selects one of the plurality of domains based on states of the plurality of domains to assign the at least one task to the selected domain, and selects at least one processor among processors in the selected domain based on states of the processors in the selected domain to assign the at least one task to the selected processor, when the at least one task is received.

According to an exemplary embodiment of the inventive concept, in a method of operating a multi-processor system that includes a plurality of processors, one of a plurality of domains is selected based on states of the plurality of domains to assign at least one task to the selected domain, when the at least one task is received. Each of the plurality of processors is included in at least one of the plurality of domains. The plurality of domains includes three or more domains and are defined based on a hierarchical domain structure. At least one processor among processors in the selected domain is selected based on states of the processors in the selected domain to assign the at least one task to the selected processor.

According to an exemplary embodiment of the inventive concept, a multi-core processing device includes a plurality of processor cores, a scheduler, and a selector. Each of the plurality of processor cores is included in at least one of a plurality of domains. The plurality of domains includes three or more domains and are defined based on a hierarchical domain structure. The scheduler receives and manages at least one task performed by the plurality of processor cores. The selector selects one of the plurality of domains based on states of the plurality of domains to assign the at least one task to the selected domain, and selects at least one processor core among processor cores in the selected domain based on states of the processor cores in the selected domain to assign the at least one task to the selected processor core, when the at least one task is received.

BRIEF DESCRIPTION OF THE DRAWINGS

The above and other features of the inventive concept will be more clearly understood by describing in detail exemplary embodiments thereof with reference to the accompanying drawings.

FIG. 3 is a flowchart illustrating an example of defining a hierarchical domain structure in FIG. 1 according to an exemplary embodiment of the inventive concept.

FIGS. 8 and 9 are flowcharts illustrating examples of selecting at least one processor to assign at least one task to a selected processor in FIG. 1 according to exemplary embodiments of the inventive concept.

FIGS. 10A, 10B, 11, and 12 are diagrams for describing performance of a multi-processor system and a method of operating a multi-processor system according to an exemplary embodiment of the inventive concept.

DETAILED DESCRIPTION OF THE EMBODIMENTS

Figure 1:
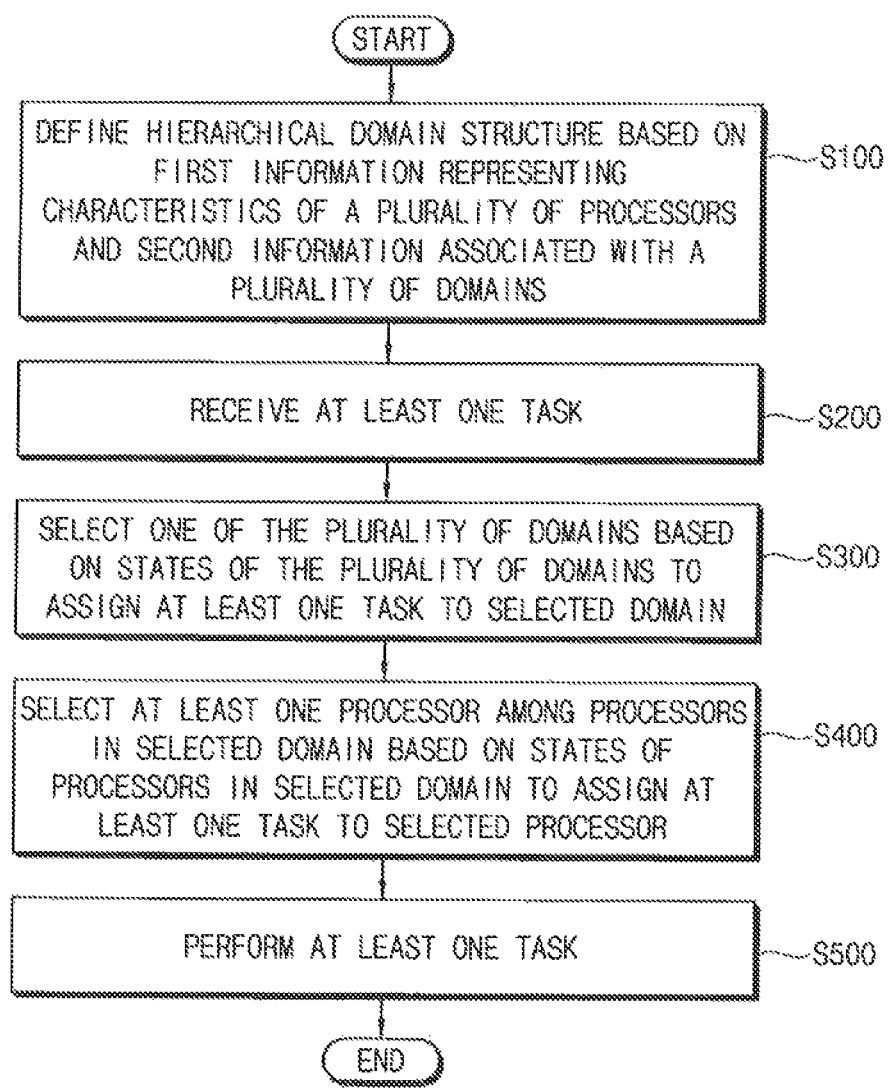
FIG. 1 is a flowchart illustrating a method of operating a multi-processor system according to an exemplary embodiment of the inventive concept.

Exemplary embodiments of the inventive concept provide a multi-processor system capable of efficiently managing performance and power consumption of a plurality of processors in the multi-processor system.

Exemplary embodiments of the inventive concept also provide a method of operating a multi-processor system capable of efficiently managing performance and power consumption of a plurality of processors in the multi-processor system.

Exemplary embodiments of the inventive concept further provide a multi-core processing device capable of efficiently managing performance and power consumption of a plurality of processor cores in the multi-core processing device.

Exemplary embodiments of the inventive concept will be described more fully with reference to the accompanying drawings. Like reference numerals may refer to like elements throughout this application.

FIG. 1 is a flowchart illustrating a method of operating a multi-processor system according to an exemplary embodiment of the inventive concept.

Referring to FIG. 1, in a method of operating a multi-processor system according to an exemplary embodiment of the inventive concept, the multi-processor system includes a plurality of processors. A hierarchical domain structure may be defined based on first information representing characteristics of the plurality of processors and second information associated with a plurality of domains such that each of the plurality of processors is included in at least one of the plurality of domains (operation S100). The plurality of domains includes three or more domains. A structure of the multi-processor system and the hierarchical domain structure will be described with reference to FIG. 2, etc.

At least one task performed by the plurality of processors may be received (operation S200). A process may represent an operation of executing an application or a program such as a video, a game, a web browser, etc. on an operating system (OS), and a task may represent a unit of scheduling for the process. In other words, a single process may include a series of tasks, and at least one of the series of tasks may be received in operation S200.

When the at least one task is received, one of the plurality of domains is selected based on states of the plurality of domains to assign the at least one task to the selected domain (operation S300). In other words, the one domain for performing the at least one task may be determined first.

When the at least one task is received, and when the one domain for performing the at least one task is selected, at least one processor among processors in the selected domain is selected based on states of the processors in the selected domain to assign the at least one task to the selected processor (operation S400). In other words, the at least one processor for performing the at least one task may be determined within the selected domain.

The at least one task may be performed based on the selected domain and the selected processor (operation S500). The at least one task may be efficiently scheduled and managed based on the hierarchical domain structure and a two-stage task assigning as performed in operations S300 and S400. An operation in operations S300 and S400 may be referred to as a task assigning algorithm or a task packing algorithm.

In exemplary embodiments of the inventive concept, operation S100 may be omitted. In this example, the hierarchical domain structure may be predefined, and operations S200, S300, S400, and S500 may be performed by loading and using the predefined hierarchical domain structure.

Figure 2:
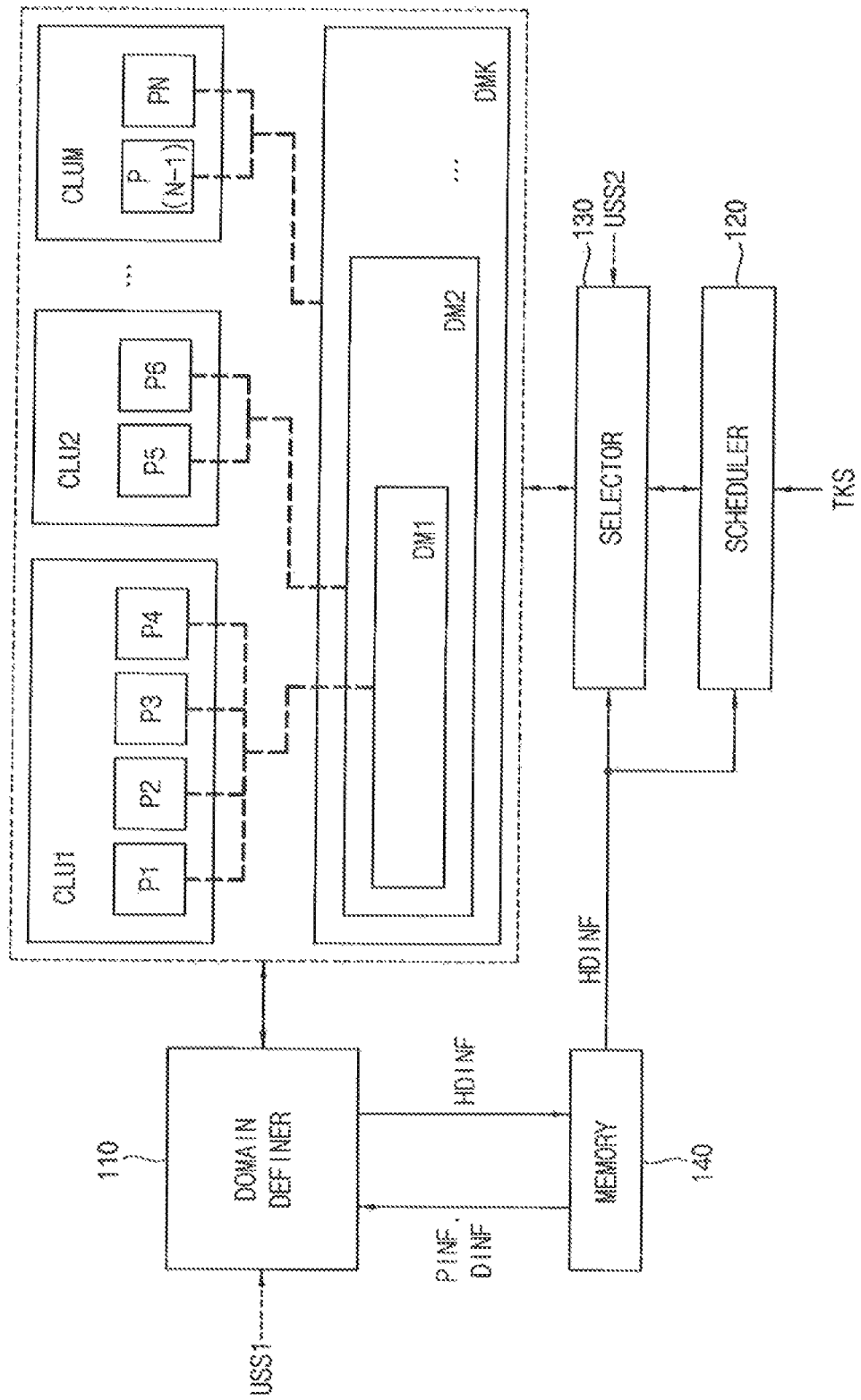
FIG. 2 is a block diagram illustrating a multi-processor system according to an exemplary embodiment of the inventive concept.

FIG. 2 is a block diagram illustrating a multi-processor system according to an exemplary embodiment of the inventive concept.

Referring to FIG. 2, a multi-processor system 100 includes a plurality of processors P1, P2, P3, P4, P5, P6, ..., P(N−1), and PN, a scheduler 120, and a selector 130. The multi-processor system 100 may further include a plurality of clusters CLU1, CLU2, ..., CLUM, a domain definer 110, and a memory 140.

The plurality of processors P1, P2, P3, P4, P5, P6, ..., P(N−1), and PN perform various computational functions, such as particular calculations, works, jobs, and tasks. In exemplary embodiments of the inventive concept, each of the plurality of processors P1, P2, P3, P4, P5, P6, ..., P(N−1), and PN may include a central processing unit (CPU), a microprocessor, etc. In exemplary embodiments of the inventive concept, each of the plurality of processors P1, P2, P3, P4, P5, P6, ..., P(N−1), and PN may include one of various processors, e.g., a graphic processing unit (GPU), an image signal processor (ISP), a digital signal processor (DSP), a display processor, a communication processor (e.g., a modem chip), a multimedia processor, or the like.

Each of the plurality of processors P1, P2, P3, P4, P5, P6, ..., P(N−1), and PN may be included in a respective one of the plurality of clusters CLU1, CLU2, ..., CLUM. For example, N processors and M clusters are illustrated in FIG. 2, where each of N and M is a natural number greater than or equal to three. The processors P1, P2, P3, and P4 may be included in the first cluster CLU1, the processors P5 and P6 may be included in the second cluster CLU2, and the processors P(N−1) and PN may be included in the M-th cluster CLUM.

The plurality of clusters CLU1, CLU2, ..., CLUM may be physically separated from one another in a hardware configuration. A single cluster may form one power domain which independently and individually controls power. For example, the first cluster CLU1 may form a first power domain, and the processors P1, P2, P3, and P4 may be included in the first power domain. The second cluster CLU2 may form a second power domain which is physically separated from the first power domain, and the processors P5 and P6 may be included in the second power domain such that the processors P5 and P6 are physically separated from the processors P1, P2, P3, and P4. In other words, the plurality of clusters CLU1, CLU2, ..., CLUM or the plurality of power domains may represent the physical separation for the plurality of processors P1, P2, P3, P4, P5, P6, ..., P(N−1), and PN. Processors in the same power domain may be physically connected to one another in a hardware configuration.

In exemplary embodiments of the inventive concept, one cluster may include at least one processor, and thus the number of the plurality of clusters CLU1, CLU2, ..., CLUM may be smaller than or equal to the number of the plurality of processors P1, P2, P3, P4, P5, P6, ..., P(N−1), and PN (e.g., M≤N).

Each of the plurality of processors P1, P2, P3, P4, P5, P6, ..., P(N−1), and PN may include a level one (L1) cache, and each of the plurality of clusters CLU1, CLU2, ..., CLUM may include a level two (L2) cache. In this example, the multi-processor system 100 may further include a cache coherent interface for managing the caches.

Each of the plurality of processors P1, P2, P3, P4, P5, P6, ..., P(N−1), and PN is included in at least one of a plurality of domains DM1, DM2, ..., DMK. The plurality of domains DM1, DM2, ..., DMK includes three or more domains and are defined based on the hierarchical domain structure. For example, K domains are illustrated in FIG. 2, where K is a natural number greater than or equal to three. The K domains may be hierarchically defined or implemented such that the second domain DM2 includes the first domain DM1 and the K-th domain DMK includes the other domains DM1 and DM2. In addition, as illustrated by bold dotted lines in FIG. 2, the hierarchical domain structure may be defined or implemented such that the processors P1, P2, P3, and P4 correspond to (e.g., are included in) the first domain DM1, the processors P5 and P6 correspond to (e.g., are included in) the second domain DM2, and the processors P(N−1) and PN correspond to (e.g., are included in) the K-th domain DMK.

Unlike the plurality of clusters CLU1, CLU2, ..., CLUM or the plurality of power domains, the plurality of domains DM1, DM2, ..., DMK may represent the functional and/or conceptual separation for the plurality of processors P1, P2, P3, P4, P5, P6, ..., P(N−1), and PN such that the functional and/or conceptual separation is appropriate to or suitable for processes and/or tasks performed by the plurality of processors P1, P2, P3, P4, P5, P6, ..., P(N−1), and PN.

In other words, the plurality of domains DM1, DM2, ..., DMK defined according to the hierarchical domain structure of the inventive concept may be different from the power domains, and may be referred to as task domains, processor domains, etc.

In exemplary embodiments of the inventive concept, one domain may include at least one processor, and thus the number of the plurality of domains DM1, DM2, ..., DMK may be smaller than or equal to the number of the plurality of processors P1, P2, P3, P4, P5, P6, ..., P(N−1), and PN (e.g., K≤N).

According to an exemplary embodiment of the inventive concept, the number of the plurality of domains DM1, DM2, ..., DMK may be equal to or different from the number of the plurality of clusters CLU1, CLU2, ..., CLUM. According to an exemplary embodiment of the inventive concept, the hierarchical domain structure may be defined such that the hierarchical domain structure is related to (e.g., corresponds to) to the structure of the plurality of clusters CLU1, CLU2, ..., CLUM or the plurality of power domains. Alternatively, the hierarchical domain structure may be unrelated to the structure of the plurality of clusters CLU1, CLU2, CLUM or the plurality of power domains The domain definer 110 may define the hierarchical domain structure based on first information PINF representing characteristics of the plurality of processors P1, P2, P3, P4, P5, P6, ..., P(N−1), and PN and second information DINF associated with the plurality of domains DM1, DM2, ..., DMK such that the plurality of domains DM1, DM2, ..., DMK are hierarchically implemented and each of the plurality of processors P1, P2, P3, P4, P5, P6, ..., P(N−1), and PN is included in the at least one of the plurality of domains DM1, DM2, ..., DMK. For example, the first information PINF and the second information DINF may be provided as a form of device tree including hardware characteristic information. The domain definer 110 may generate third information HDINF representing the hierarchical domain structure.

In exemplary embodiments of the inventive concept, the domain definer 110 may receive a first user setting signal USS1. When the first user setting signal USS1 is received, the domain definer 110 may change the predefined hierarchical domain structure based on the first user setting signal USS1. In other words, the hierarchical domain structure may be changeable by the domain definer 110 based on a user setting signal.

The scheduler 120 receives and manages at least one task TKS performed by the plurality of processors P1, P2, P3, P4, P5, P6, ..., P(N−1), and PN. When the at least one task TKS is received, the selector 130 selects one of the plurality of domains DM1, DM2, ..., DMK based on states of the plurality of domains DM1, DM2, ..., DMK to assign the at least one task TKS to the selected domain, and selects at least one processor among processors in the selected domain based on states of the processors in the selected domain to assign the at least one task TKS to the selected processor. The scheduler 120 and the selector 130 may schedule, manage, and assign the at least one task TKS based on the third information HDINF representing the hierarchical domain structure.

The selected processor among the plurality of processors P1, P2, P3, P4, P5, P6, ..., P(N−1), and PN may perform the at least one task TKS.

In exemplary embodiments of the inventive concept, the selector 130 may receive a second user setting signal USS2. When the second user setting signal USS2 is received, the selector 130 may be disabled and may not perform the two-stage task assigning described above, and the scheduler 120 may select any processor to assign the at least one task TKS to the selected processor based on a general or typical task assigning. In other words, the selector 130 may be disabled based on a user setting signal.

The memory 140 may store the first information PILAF, the second information DINF, and the third information HDINF. For example, the memory 140 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc. Alternatively, the memory 140 may include a solid state drive or solid state disk (SSD), an embedded SSD (eSSD), a multimedia card (MMC), an embedded MMC (eMMC), a universal flash storage (UFS), etc.

The multi-processor system 100 may perform the above-described method of operating the multi-processor system according to an exemplary embodiment of the inventive concept. For example, operation S100 in FIG. 1 may be performed by the domain definer 110, operation S200 in FIG. 1 may be performed by the scheduler 120, operations S300 and S400 may be performed by the selector 130, and operation S500 may be performed by at least one of the plurality of processors P1, P2, P3, P4, P5, P6, ..., P(N−1), and PN.

In exemplary embodiments of the inventive concept, the multi-processor system 100 may be implemented as a system-on-chip (SOC). In this example, the multi-processor system 100 may further include a plurality of functional blocks.

The plurality of processors P1, P2, P3, P4, P5, P6, ..., P(N−1), and PN, the domain definer 110, the scheduler 120, the selector 130, and the memory 140 may communicate signals and/or data with one another via a bus. In exemplary embodiments of the inventive concept, the bus may be implemented as an advanced microcontroller bus architecture (AMBA), an advanced high-performance bus (AHB), an advanced peripheral bus (APB), an advanced extensible interface (AXI), an advanced system bus (ASB), AXI Coherency Extensions (ACE), or a combination thereof.

FIG. 3 is a flowchart illustrating an example of defining a hierarchical domain structure in FIG. 1 according to an exemplary embodiment of the inventive concept.

Referring to FIGS. 1 and 3, in the operation of defining the hierarchical domain structure (operation S100), the plurality of processors and the plurality of domains may be analyzed or parsed (operation S110). For example, as illustrated in FIG. 2, the plurality of processors P1, P2, P3, P4, P5, P6, ..., P(N−1), and PN and the plurality of domains DM1, DM2, ..., DMK may be analyzed or parsed based on the first information PINF representing the characteristics of the plurality of processors P1, P2, P3, P4, P5, P6, ..., P(N−1), and PN and the second information DINF associated with the plurality of domains DM1, DM2, ..., DMK.

The plurality of domains may be arranged or disposed hierarchically (operation S120), and the plurality of processors may be arranged or disposed such that each of the plurality of processors is included in at least one of the plurality of domains (operation S130). For example, as illustrated in FIG. 2, the hierarchical domain structure including the plurality of processors P1, P2, P3, P4, P5, P6, ..., P(N−1), and PN and the plurality of domains DM1, DM2, ..., DMK may be defined or implemented. For example, the plurality of domains DM1, DM2, ..., DMK may be sequentially arranged or disposed from the first domain DM1 to the last domain DMK, and the plurality of processors P1, P2, P3, P4, P5, P6, ..., P(N−1), and PN may be sequentially arranged or disposed from the first processor P1 to the last processor PN.

In exemplary embodiments of the inventive concept, operations S110, S120, and S130 in FIG. 3 may be performed by the domain definer 110 in FIG. 2.

FIGS. 4A, 4B, 4C, 5A, and 5B are diagrams for describing an operation of defining the hierarchical domain structure of FIG. 3 according to exemplary embodiments of the inventive concept.

Figure 4A:
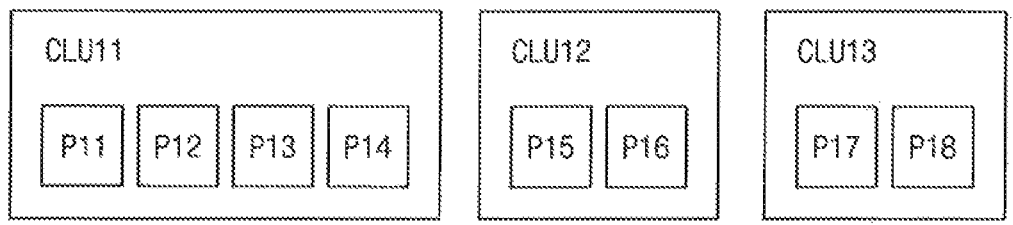
FIGS. 4A, 4B, 4C, 5A, and 5B are diagrams for describing an operation of defining the hierarchical domain structure of FIG. 3 according to exemplary embodiments of the inventive concept.

Referring to FIG. 4A, eight processors P11, P12, P13, P14, P15, P16, P17, and P18 may be divided into three clusters CLU11, CLU12, and CLU13. The first cluster CLU11 may form a first power domain and may include the first, second, third, and fourth processors P11, P12, P13, and P14. The second cluster CLU12 may form a second power domain and may include the fifth and sixth processors P15 and P16. The third cluster CLU13 may form a third power domain and may include the seventh and eighth processors P17 and P18.

Figure 4B:
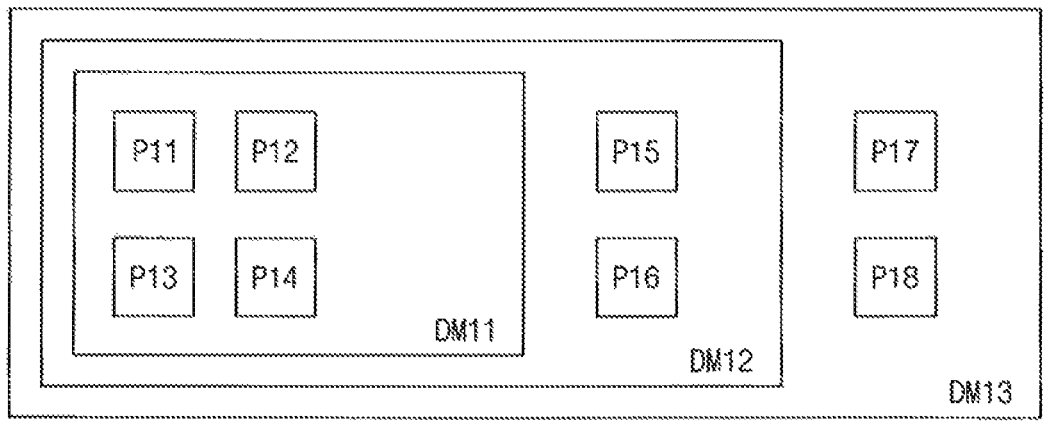

Referring to FIG. 4B, the eight processors P11, P12, P13, P14, P15, P16, P17, and P18 of FIG. 4A are arranged or disposed in three domains DM11, DM12, and DM13 that are hierarchically defined or implemented according to exemplary embodiments of the inventive concept. The first domain DM11 may be included in the second domain DM12, and the second domain DM12 may be included in the third domain DM13. The first, second, third, and fourth processors P11, P12, P13, and P14 may be included in the first domain DM11, the first, second, third, fourth, fifth, and sixth processors P11, P12, P13, P14, P15, and P16 may be included in the second domain DM12, and the first, second, third, fourth, fifth, sixth, seventh, and eighth processors P11, P12, P13, P14, P15, P16, P17, and P18 may be included in the third domain DM13.

In the example of FIG. 4B, a configuration of the domains DM11, DM12, and DM13 may fully or totally correspond to a configuration of the clusters CLU11, CLU12, and CLU13 (e.g., in FIG. 4A) or the power domains. For example, the processors P11, P12, P13, and P14 only included in the first domain DM11 may be included in the first cluster CLU11, the processors P15 and P16 only included in the second domain DM12 may be included in the second cluster CLU12, and the processors P17 and P18 only included in the third domain DM13 may be included in the third cluster CLU13. In addition, the first domain DM11 may correspond to all of the first power domain, the second domain DM12 may correspond to all of the first and second power domains, and the third domain DM13 may correspond to all of the first, second, and third power domains. In other words, the first domain DM11 may correspond to one power domain, and each of the second and third domains DM12 and D13 may correspond to two or more different power domains.

Figure 4C:
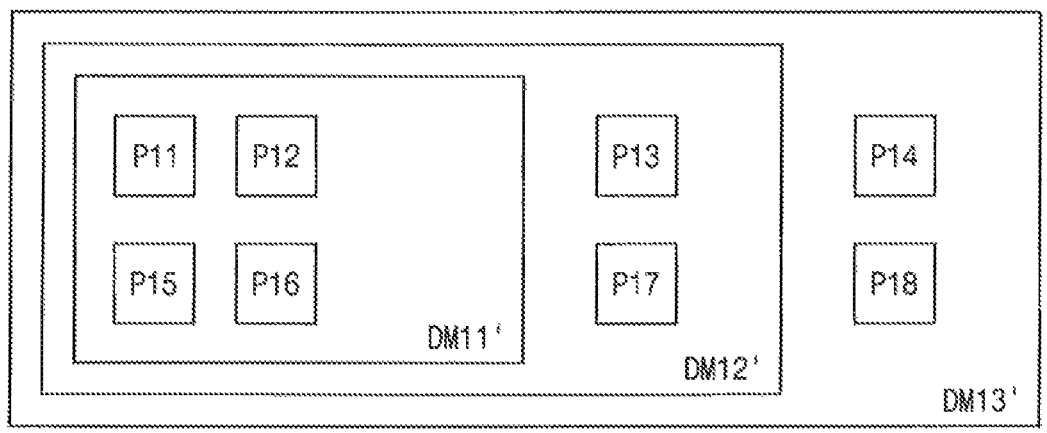

Referring to FIG. 4C, the eight processors P11, P12, P13, P14, P15, P16, P17, and P18 of FIG. 4A are arranged or disposed in three domains DM11', DM12', and DM13' that are hierarchically defined or implemented according to exemplary embodiments of the inventive concept. The first domain DM11' may be included in the second domain DM12', and the second domain DM12' may be included in the third domain DM13'. The first, second, fifth, and sixth processors P11, P12, P15, and P16 may be included in the first domain DM11', the first, second, third, fifth, sixth, and seventh processors P11, P12, P13, P15, P16, and P17 may be included in the second domain DM12', and the first, second, third, fourth, fifth, sixth, seventh, and eighth processors P11, P12, P13, P14, P15, P16, P17, and P18 may be included in the third domain DM13'.

In the example of FIG. 4C, a configuration of the domains DM11', DM12', and DM13' may not correspond to the configuration of the clusters CLU11, CLU12, and CLU13 or the power domains. For example, the processors P11, P12, P13, and P14 included in the first cluster CLU11 may be included in the first, second, and third domains DM11', DM12', and DM13', the processors P15 and P16 included in the second cluster CLU12 may only be included in the first domain DM11', and the processors P17 and P18 included in the third cluster CLU13 may only be included in the second and third domains DM12' and DM13'. In addition, the first domain DM11' may correspond to a part of the first and second power domains, the second domain DM12' may correspond to a part of the first, second, and third power domains, and the third domain DM13' may correspond to all of the first, second, and third power domains.

Figure 5A:
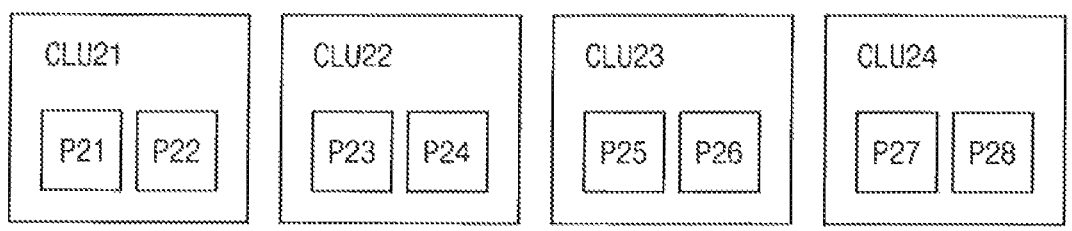

Referring to FIG. 5A, eight processors P21, P22, P23, P24, P25, P26, P27, and P28 may be divided into four clusters CLU21, CLU22, CLU23, and CLU24. The first cluster CLU21 may form a first power domain and may include the first and second processors P21 and P22. The second cluster CLU22 may form a second power domain and may include the third and fourth P23 and P24. The third cluster CLU23 may form a third power domain and may include the fifth and sixth processors P25 and P26. The fourth cluster CLU24 may form a fourth power domain and may include the seventh and eighth processors P27 and P28.

Figure 5B:
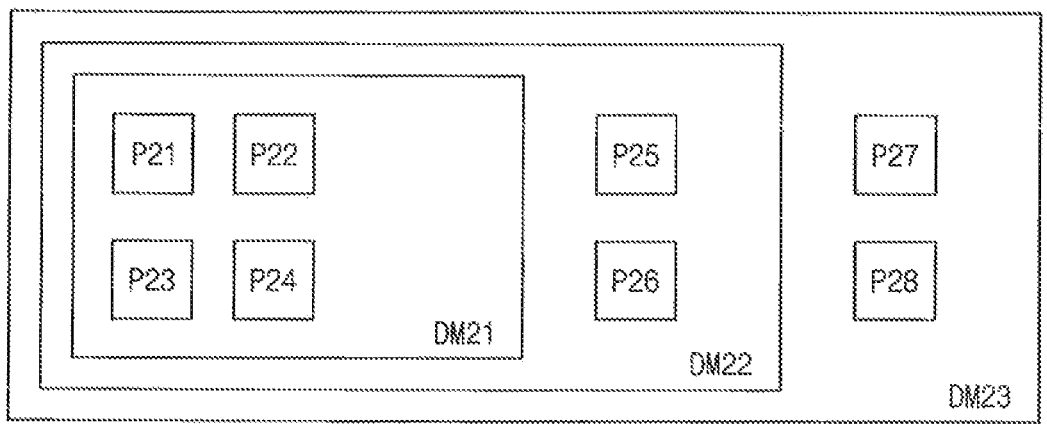

Referring to FIG. 5B, the eight processors P21, P22, P23, P24, P25, P26, P27, and P28 of FIG. 5A are arranged or disposed in three domains DM21, DM22, and DM23 that are hierarchically defined or implemented according to exemplary embodiments of the inventive concept is illustrated in FIG. 5B. The first domain DM21 may be included in the second domain DM22, and the second domain DM22 may be included in the third domain DM23. The first, second, third, and fourth processors P21, P22, P23, and P24 may be included in the first domain DM21, the first, second, third, fourth, fifth, and sixth processors P21, P22, P23, P24, P25, and P26 may be included in the second domain DM22, and the first, second, third, fourth, fifth, sixth, seventh, and eighth processors P21, P22, P23, P24, P25, P26, P27, and P28 may be included in the third domain DM23.

In the example of FIG. 5B, a configuration of the domains DM21, DM22, and DM23 may partially correspond to a configuration of the clusters CLU21, CLU22, CLU23, and CLU24 or the power domains. In other words, the configuration of the domains DM21, DM22, and DM23 may correspond to the configuration of the clusters CLU21, CLU22, CLU23, and CLU24 or the power domains, except that the first domain DM21 corresponds to both the first and second power domains.

To define the hierarchical domain structure according to an exemplary embodiment of the inventive concept, some standards or criteria may be used or applied as follows. First of all, the plurality of domains may be defined of implemented hierarchically. Each processor may be included in at least one domain, and each domain may include at least one processor which is only included in that domain. One processor may be included in all of the plurality of domains. The plurality of domains may be defined or implemented such that a configuration of the domains corresponds to or does not correspond to a configuration of the power domains. Two or more different power domains may be defined as one domain. In other words, to efficiently manage power consumption, the plurality of domains may be defined based on the plurality of power domains.

Although the hierarchical domain structure according to exemplary embodiments of the inventive concept is described with reference to FIGS. 4B, 4C, and 5B, the inventive concept is not limited thereto. For example, each of the processors in FIGS. 4A and 5A may be arranged or disposed in at least one domain based on various schemes. In addition, although the hierarchical domain structure according to exemplary embodiments of the inventive concept is described based on a specific number of processors, a specific number of clusters (or power domains), and a specific number of domains, the inventive concept is not limited thereto.

Although FIGS. 4A, 4B, and 4C illustrate examples where the number of domains is equal to the number of clusters (or power domains), and FIGS. 5A and 5B illustrate an example where the number of domains is smaller than the number of clusters (or power domains), the inventive concept is not limited thereto. For example, the number of domains may be greater than the number of clusters (or power domains).

Figure 6:
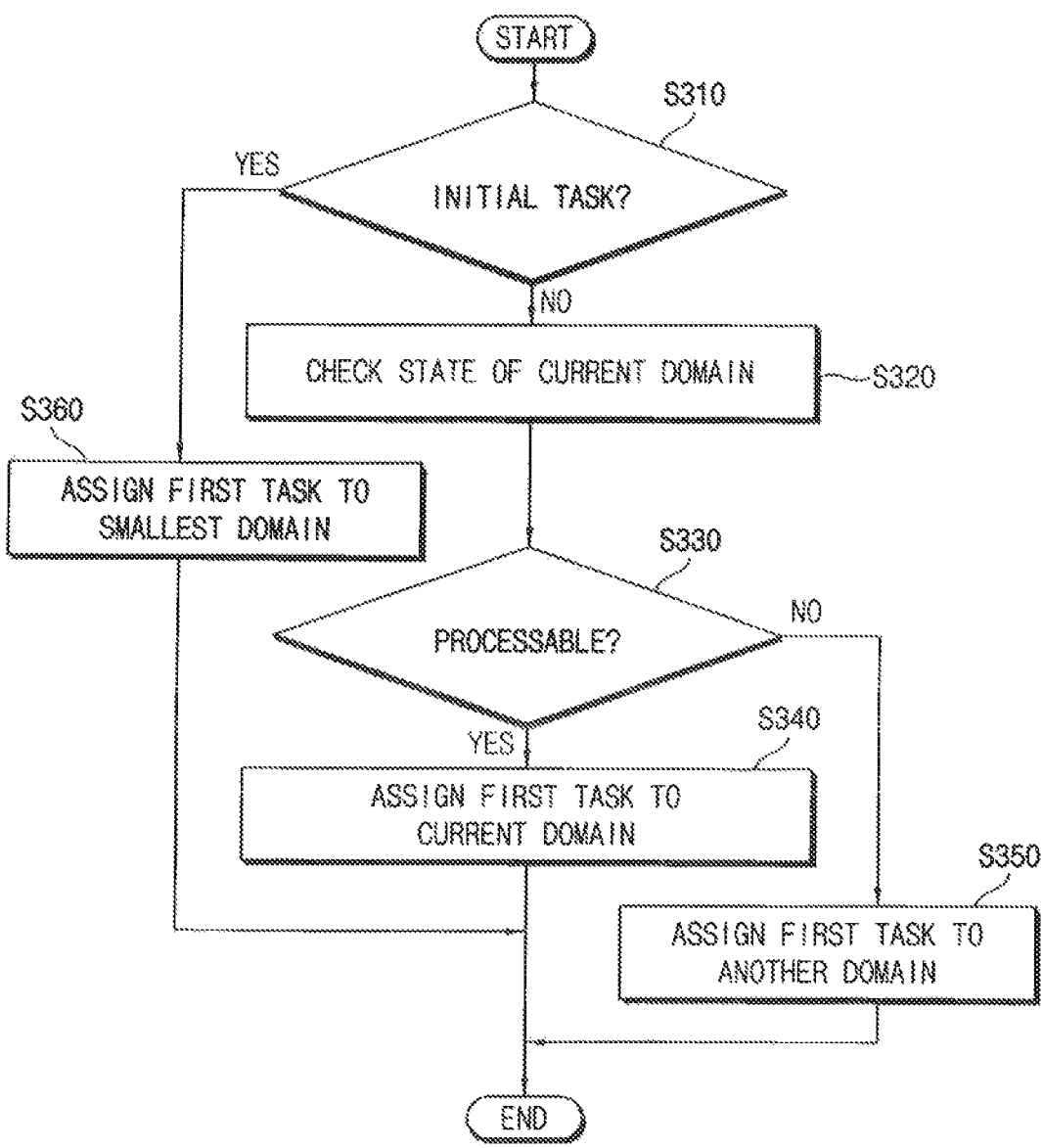
FIGS. 6 and 7 are flowcharts illustrating examples of selecting one domain to assign at least one task to a selected domain in FIG. 1 according to exemplary embodiments of the inventive concept.
Figure 7:
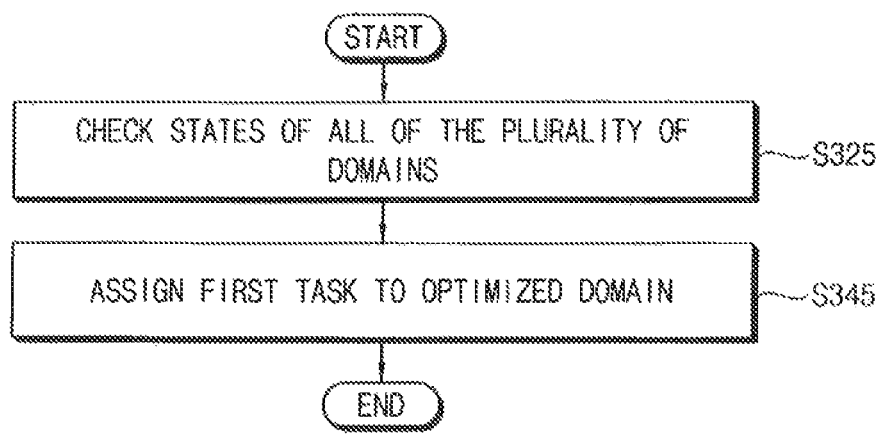

FIGS. 6 and 7 are flowcharts illustrating examples of selecting one domain to assign at least one task to a selected domain in FIG. 1 according to exemplary embodiments of the inventive concept.

Referring to FIGS. 1 and 6, in the operation of selecting one of the plurality of domains to assign the at least one task to the selected domain (operation S300), an operation of assigning a first task (e.g., a single task) is described based on an example where the first task is received in operation S200.

When the first task is received, it may be determined first whether the first task is an initial task or not (operation S310). The initial task may represent a task which is initially received or generated.

When the first task is not the initial task (operation S310: NO), e.g., when a current domain which is performing or processing another task other than the first task exists, a state of the current domain may be checked (operation S320). For example, the state of the current domain may include at least one of utilization of the current domain and load (e.g., workload) of the current domain, and may further include at least one of various factors/variables such as power consumption, etc.

When it is determined that the first task is sufficiently processable by the current domain (operation S330: YES), the first task may be assigned to the current domain (operation S340).

When it is determined that the first task is unprocessable by the current domain (operation S330: NO), the first task may be assigned to a domain among the plurality of domains other than the current domain (operation S350). In other words, an existing domain (e.g., the current domain) may be maintained or a new domain may be selected based on a result of operation S330.

In exemplary embodiments of the inventive concept, the domain for assigning the first task in operation S350 may be one of the domains including the current domain, and particularly, a domain which is immediately subsequent to the current domain and directly includes the current domain. For example, as illustrated in FIG. 2, when the first domain DM1 among the plurality of domains DM1, DM2, ..., DMK is the current domain, one of the domains DM2, DMK including the first domain DM1 may be the domain for assigning the first task in operation S350, and particularly, the second domain DM2 may be the domain for assigning the first task in operation S350.

In exemplary embodiments of the inventive concept, it may be determined, in operation S330, whether the first task is processable by the current domain based on at least one of the state of the current domain, utilization by the first task, and a priority of the first task. For example, the utilization by the first task may represent utilization of the selected processor by performing the first task and/or utilization of processor resources by performing the first task.

When the first task is the initial task (operation S310: YES), e.g., when the current domain does not exist, the first task may be assigned to the smallest domain among the plurality of domains (operation S360). Typically, the initial task may have a relatively light workload, and thus it may not be a problem even if the initial task is assigned to the smallest domain. For example, as illustrated in FIG. 2, the first task may be assigned to the first domain DM1 which is the smallest domain among the plurality of domains DM1, DM2, ..., DMK.

Referring to FIGS. 1 and 7, in the operation of selecting one of the plurality of domains to assign the at least one task to the selected domain (operation S300), an operation of assigning the first task (e.g., a single task) is described based on an example where the first task is received in operation S200.

When the first task is received, the states of all of the plurality of domains may be checked (operation S325), and the first task may be assigned to an optimized domain among the plurality of domains by which the first task is processable (operation S345). Unlike the example of FIG. 6 where the state of the current domain is only checked, the states of all of the plurality of domains may be checked in the example of FIG. 7.

In exemplary embodiments of the inventive concept, the optimized domain may be determined, in operation S345, based on at least one of the states of all of the plurality of domains, utilization by the first task, and a priority of the first task.

In exemplary embodiments of the inventive concept, operations S310, S320, S330, S340, S350, and S360 in FIG. 6 and operations S325 and S345 in FIG. 7 may be performed by the selector 130 in FIG. 2.

FIGS. 8 and 9 are flowcharts illustrating examples of selecting at least one processor to assign at least one task to a selected processor in FIG. 1 according to exemplary embodiments of the inventive concept.

Referring to FIGS. 1 and 8, in the operation of selecting the at least one processor among processors in the selected domain based on states of the processors in the selected domain to assign the at least one task to the selected processor (operation S400), an operation of assigning the first task (e.g., a single task) is described based on an example where the first task is received in operation S200 and a first domain is selected in operation S300.

When the first task is received and assigned to the first domain among the plurality of domains, states of first processors in the first domain among the plurality of processors may be checked (operation S410). For example, as illustrated in FIG. 2, when the first task is assigned to the first domain DM1 among the plurality of domains DM1, DM2, ..., DMK, states of the processors P1, P2, P3, and P4 in the first domain DM1 may be checked. For example, the states of the first processors may include at least one of availability, utilization, and load of the first processors, and may further include at least one of various factors/variables.

When an idle processor having an idle state exists (operation S420: YES), the first task may be assigned to the idle processor among the first processors (operation S430). The idle state may be opposite to an active state and may be referred to as a sleep state, a standby state, etc.

When the idle processor does not exist (operation S420: NO), e.g., when all of the first processors have the active state, the load of the first processors may be checked. When a processor having the smallest load exists (operation S440: YES), the first task may be assigned to the processor having the smallest load among the first processors (operation S450).

When the idle processor does not exist (operation S420: NO), and when the processor having the smallest load does not exist (operation S440: NO), e.g., when all of the first processors have the same load, the first task may be assigned to a processor firstly defined in the first domain among the first processors (operation S460). For example, as illustrated in FIG. 2, when the plurality of processors P1, P2, P3, P4, P5, P6, ..., P(N-1), and PN is sequentially arranged or disposed from the first processor P1 to the last processor PN, the first task may be assigned to the first processor P1 which is firstly defined in the first domain DM1.

Referring to FIGS. 1 and 9, in the operation of selecting the at least one processor among processors in the selected domain based on states of the processors in the selected domain to assign the at least one task to the selected processor (operation S400), an operation of sequentially checking all of the first processors is described with reference to the example of FIG. 8. Repeat descriptions will be omitted.

A processor X-th defined in the first domain may be set to the current processor among the first processors in the first domain, where X is a natural number (operation S415). In an initial operating time, X=1 and it may be checked from the processor firstly defined in the first domain to a processor lastly defined in the first domain.

When the current processor has the idle state (operation S425: YES), or when the current processor has the smallest load (operation S445: YES), the first task may be assigned to the current processor (operation S435). Operations S425 and S445 in FIG. 9 may be similar to operations S420 and S440 in FIG. 8, respectively.

When the current processor does not have the idle state (operation S425: NO), and when the current processor does not have the smallest load (operation S445: NO), it may be checked whether operations S415, S425, S435, and S445 are performed for all of the first processors.

For example, if the total number of the first processors is Y, X, and Y may be compared with each other, where Y is a natural number. When X and Y are not equal to each other (operation S455: NO), e.g., when X is smaller than Y, X may increase by one (operation S465), and operations S415, S425, S435, and S445 may be repeated. When X and Y are equal to each other (operation S455: YES), it means that all of the first processors have the same load, and thus the first task may be assigned to the processor firstly defined in the first domain among the first processors (operation S460). Operation S460 in FIG. 9 may be substantially the same as operation S460 in FIG. 8.

In exemplary embodiments of the inventive concept, operations S410, S420, S430, S440, S450, and S460 in FIG. 8 and operations S415, S425, S435, S445, S455, S460, and S465 in FIG. 9 may be performed by the selector 130 in FIG. 2.

In exemplary embodiments of the inventive concept, at least one of various algorithms may be further used for selecting the at least one processor among processors in the selected domain based on states of the processors in the selected domain to assign the at least one task to the selected processor (operation S400).

FIGS. 10A, 10B, 11, and 12 are diagrams for describing performance of a multi-processor system and a method of operating a multi-processor system according to an exemplary embodiment of the inventive concept.

Figure 10A:
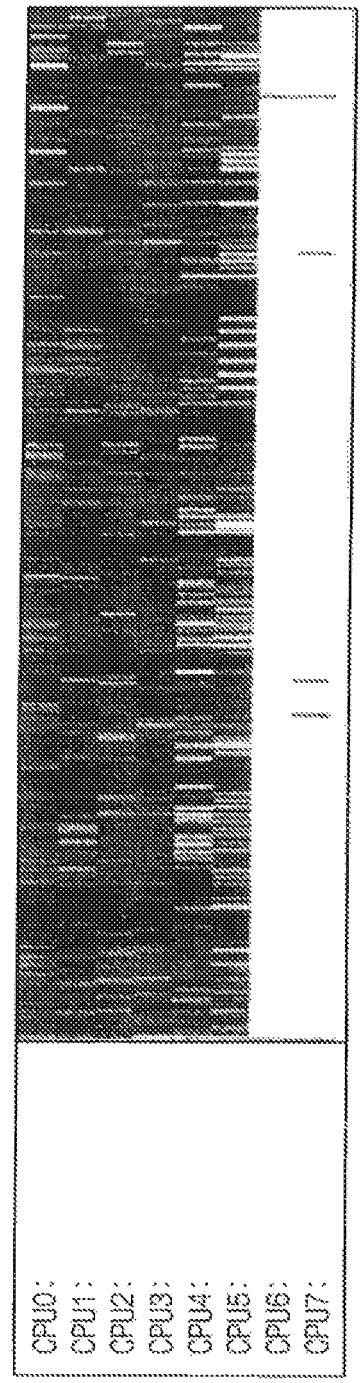

Referring to FIG. 10A, an example of a frequency (or the number of times) of usage of eight processors CPU0, CPU1, CPU2, CPU3, CPU4, CPU5, CPU6, and CPU7 based on a conventional technique is illustrated. In the example of FIG. 10A, a video or moving image is played using the eight processors CPU0, CPU1, CPU2, CPU3, CPU4, CPU5, CPU6, and CPU7 that are arranged or disposed based on a conventional technique. For example, the processors CPU0, CPU1, CPU2, CPU3, CPU4, and CPU5 may be included in a first domain with relatively low power and low performance, the processors CPU6 and CPU7 may be included in a second domain with relatively high power and high performance, and the first domain and the second domain may not be hierarchically arranged and may be separately arranged. In a conventional technique, tasks may be equally assigned to the processors CPU0, CPU1, CPU2, CPU3, CPU4, and CPU5 included in the first domain.

Figure 10B:
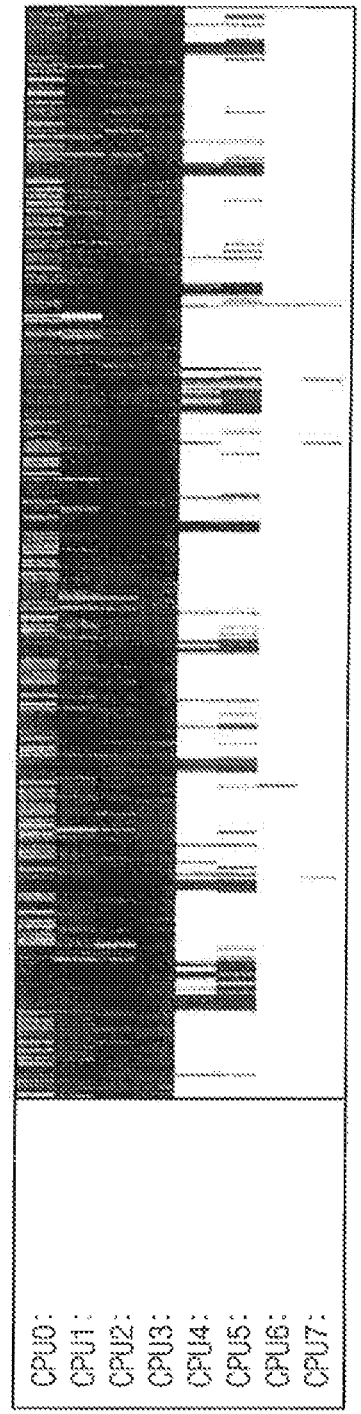

Referring to FIG. 10B, an example of a frequency (or the number of times) of usage of eight processors CPU0, CPU1, CPU2, CPU3, CPU4, CPU5, CPU6, and CPU7 based on the inventive concept is illustrated. In the example of FIG. 10B, a video or moving image is played using the eight processors CPU0, CPU1, CPU2, CPU3, CPU4, CPU5, CPU6, and CPU7 that are arranged or disposed according to exemplary embodiments of the inventive concept. For example, a hierarchical domain structure may be defined or implemented such that a first domain is included in a second domain and the second domain is included in a third domain. The processors CPU0, CPU1, CPU2, and CPU3 may be included in the first domain, the processors CPU0, CPU1, CPU2, CPU3, CPU4, and CPU5 may be included in the second domain, and the processors CPU0, CPU1, CPU2, CPU3, CPU4, CPU5, CPU6, and CPU7 may be included in the third domain. In addition, a condition of playing the video in FIG. 10B may be substantially the same as a condition of playing the video in FIG. 10A, except for the hierarchical domain structure. In the present exemplary embodiment, tasks may be assigned first to the processors CPU0, CPU1, CPU2, and CPU3 included in the first domain and may be additionally assigned to the processors CPU4 and CPU5 only during a time interval in which utilization of the processors increases. Thus, in comparison with the conventional technique, the processors CPU4 and CPU5 may be disabled for a relatively long time interval, thus reducing power consumption.

Figure 12:
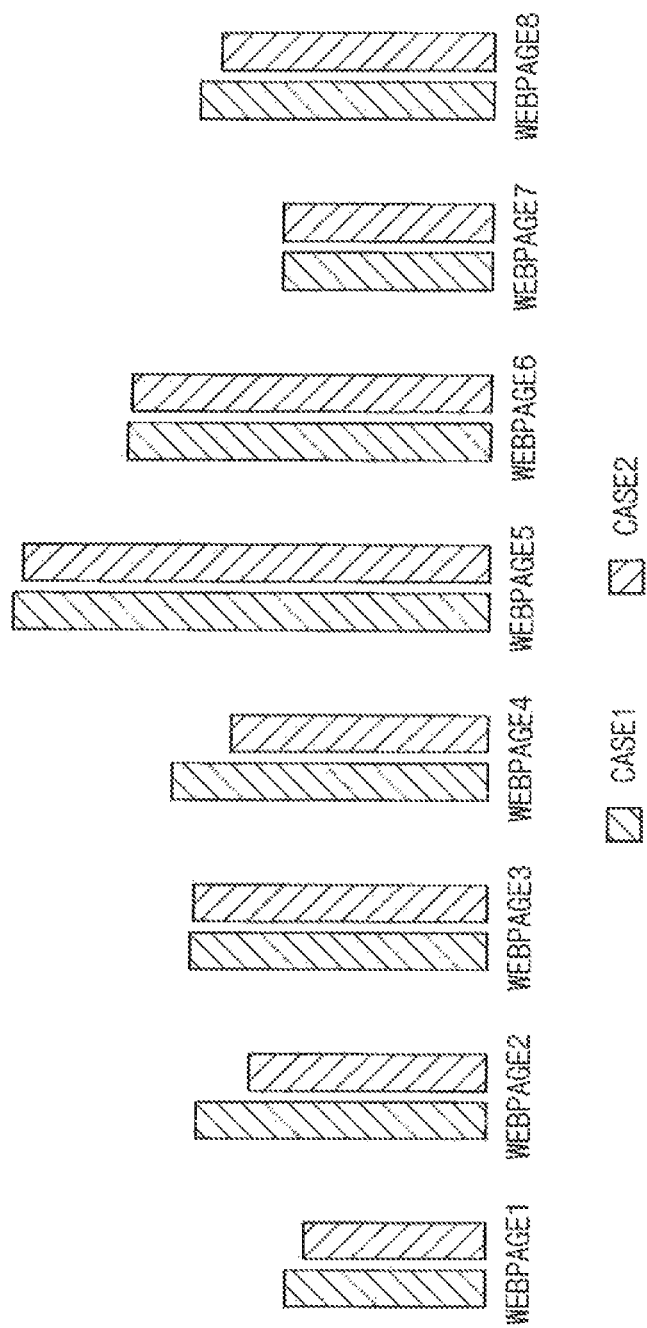

Referring to FIGS. 11 and 12, CASE1 represents examples where various scenarios are performed or executed based on the conventional technique described with reference to FIG. 10A, and CASE2 represents examples where various scenarios are performed or executed based on the inventive concept described with reference to FIG. 10B. As illustrated in FIG. 11, power consumption may be generally or mostly reduced in CASE2 for various scenarios of performing or executing an address book, a music application (APP), a screen touch, a 3-dimensional (3D) game, a gallery application, a video play, a music play, an idle screen, etc. For example, the power consumption may be reduced by about 2.19 mW on average in CASE2 as compared to CASE1. In addition, as illustrated in FIG. 12, a speed may generally or mostly increase in CASE2 for various scenarios of performing or executing various webpages WEBPAGE1, WEBPAGE2, WEBPAGE3, WEBPAGE4, WEBPAGE5, WEBPAGE6, WEBPAGE7, and WEBPAGE8. For example, the speed may increase by about 7.4% on average in CASE2 as compared to CASE1.

Figure 13:
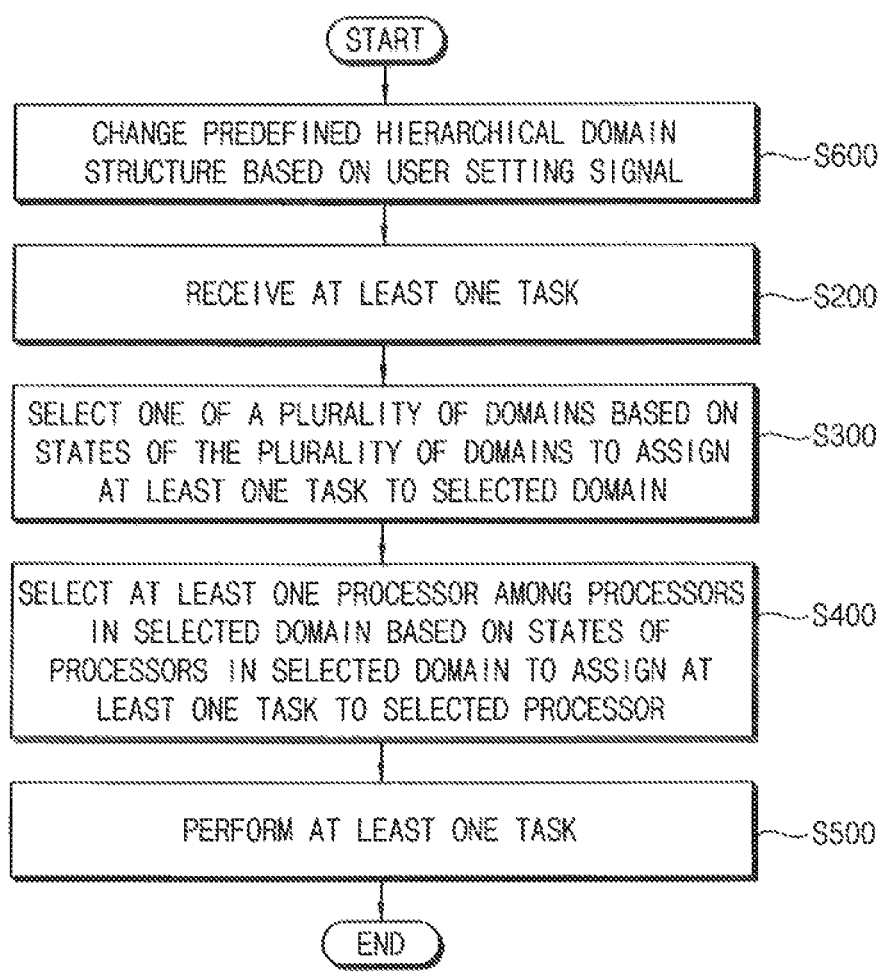
FIGS. 13 and 14 are flowcharts illustrating a method of operating a multi-processor system according to exemplary embodiments of the inventive concept.
Figure 14:
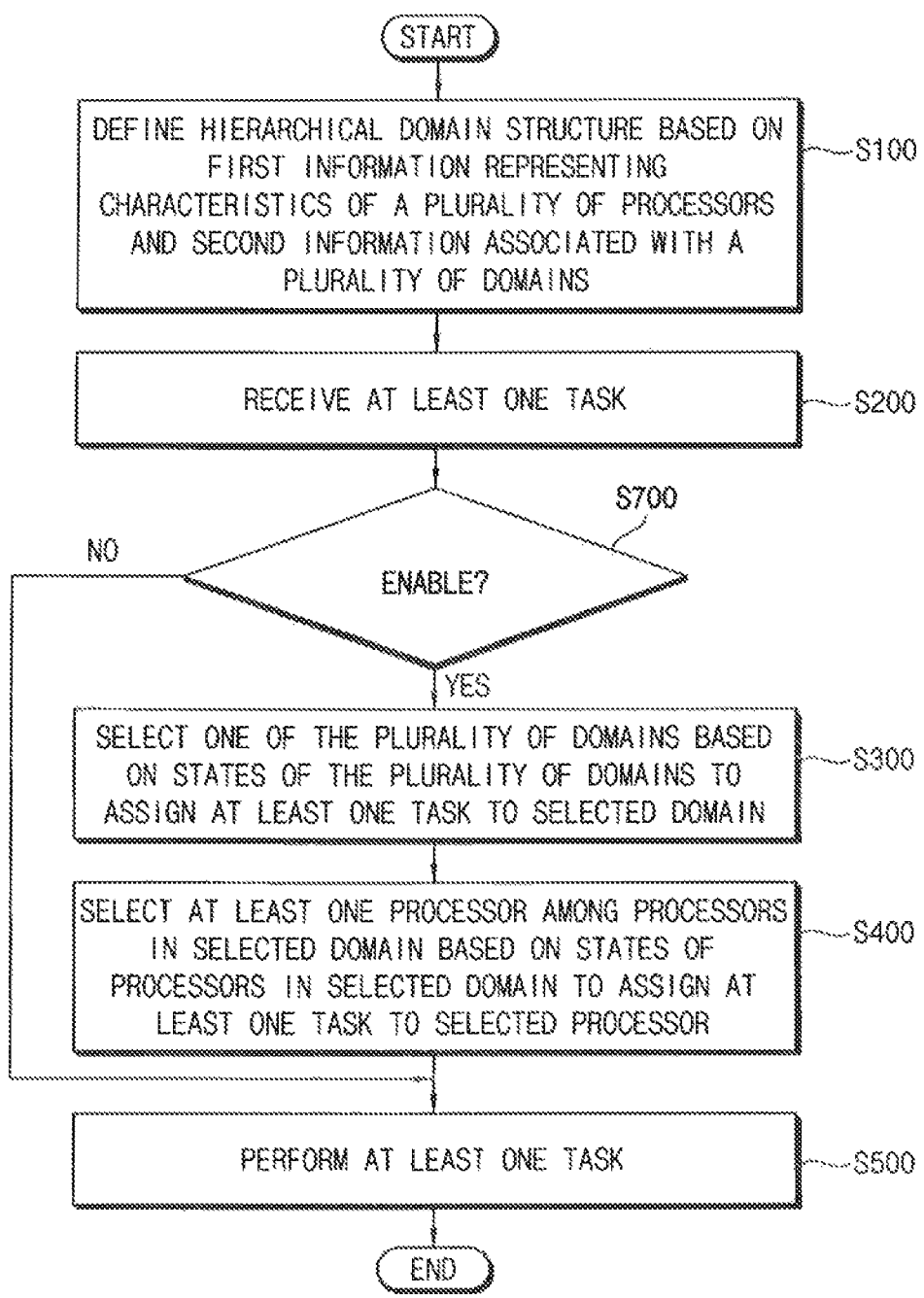

FIGS. 13 and 14 are flowcharts illustrating a method of operating a multi-processor system according to exemplary embodiments of the inventive concept. Repeat descriptions will be omitted.

Referring to FIG. 13, a method of operating a multi-processor system of FIG. 13 may be substantially the same as the method of operating the multi-processor system of FIG. 1, except that operation S100 is omitted and operation S600 is added in FIG. 13.

In the method of operating the multi-processor system according to an exemplary embodiment of the inventive concept, the hierarchical domain structure may be predefined. Before operations S200, S300, S400, and S500 are performed, the predefined hierarchical domain structure may be changed based on a user setting signal (operation S600). For example, as illustrated in FIG. 2, when the first user setting signal USS1 is received, the domain definer 110 may change the predefined hierarchical domain structure based on the first user setting signal USS1. In other words, the hierarchical domain structure may be changeable based on an external setting.

Operations S200, S300, S400, and S500 may be performed based on the hierarchical domain structure changed in operation S600.

Referring to FIG. 14, a method of operating a multi-processor system of FIG. 14 may be substantially the same as the method of operating the multi-processor system of FIG. 1, except that operation S700 is added in FIG. 14.

After operations S100 and S200 are performed, it may be determined whether the task assigning algorithm or the task packing algorithm according to exemplary embodiments of the inventive concept is enabled or disabled (operation S700).

When the task assigning algorithm or the task packing algorithm is enabled (operation S700: YES), the two-stage task assigning in operations S300 and S400 may be performed, and operation S500 may be performed by the selected domain and the selected processor.

When the task assigning algorithm or the task packing algorithm is disabled (operation S700: NO), operations S300 and S400 may be omitted. For example, as illustrated in FIG. 2, when the second user setting signal USS2 is received, the selector 130 may be disabled and may not perform the two-stage task assigning described above. In other words, the task assigning algorithm or the task packing algorithm may be selectively turned on or off based on an external setting.

When the task assigning algorithm or the task packing algorithm is disabled, the scheduler 120 may select any processor based on a general or typical task assigning, and operation S500 may be performed by the selected processor.

In the multi-processor system and the method of operating the multi-processor system according to an exemplary embodiment of the inventive concept, the plurality of processors having various characteristics may be implemented with a multi-cluster environment, the plurality of domains (e.g., three or more domains) may be defined based on the hierarchical domain structure, each of the plurality of processors may be included in at least one of the plurality of domains, and thus the plurality of domains may be efficiently managed. In addition, the received task may be assigned to the specific domain and the specific processor based on the task assigning algorithm or the task packing algorithm (e.g., the two-stage task assigning in operation S300 and S400), and thus the tasks performed by the plurality of processors may be efficiently scheduled and managed. Accordingly, the performance and power consumption of the multi-processor system may be efficiently managed, and the multi-processor system may have improved or enhanced performance and reduced power consumption.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

Figure 15:
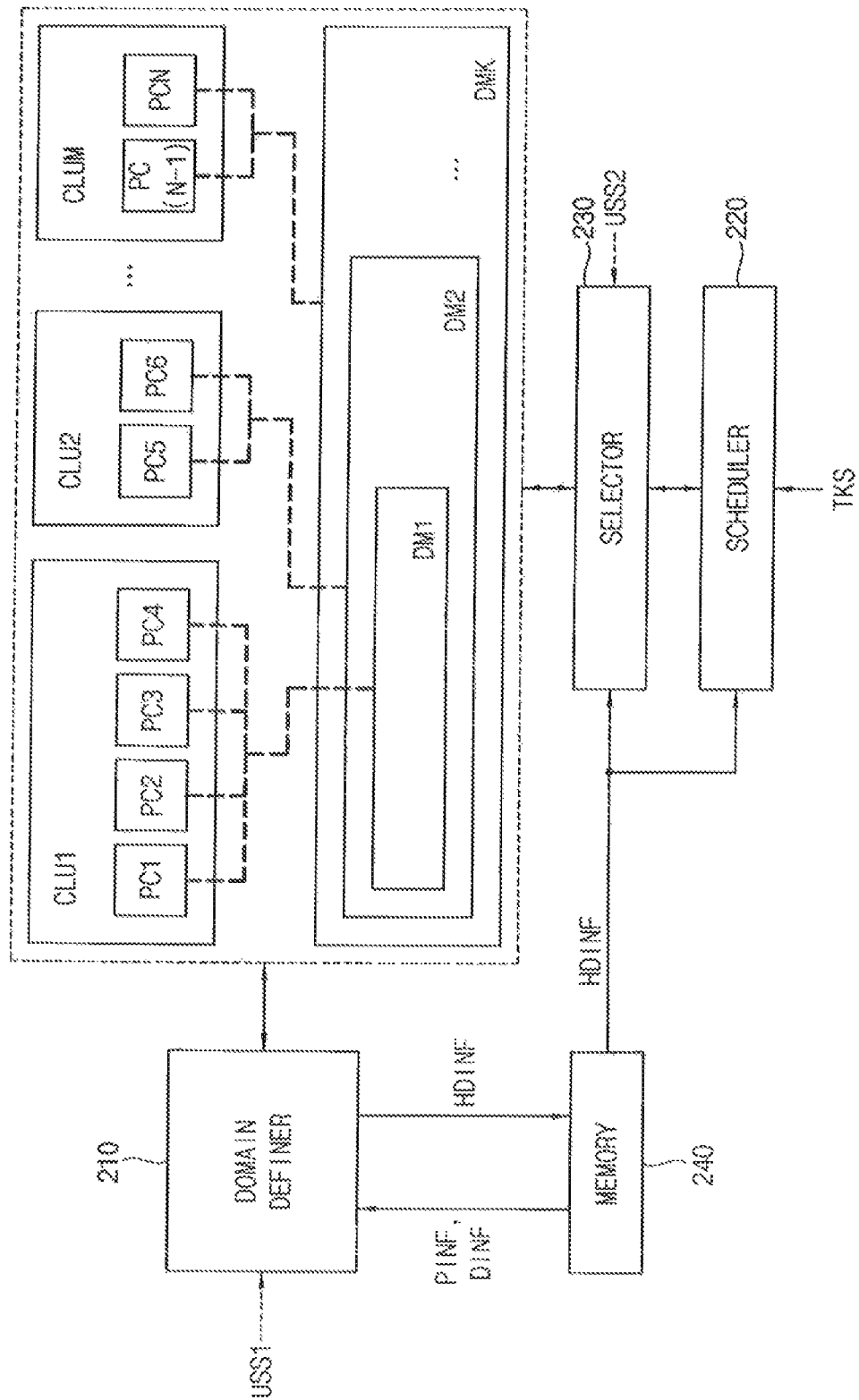
FIG. 15 is a block diagram illustrating a multi-core processing device according to an exemplary embodiment of the inventive concept.

FIG. 15 is a block diagram illustrating a multi-core processing device according to an exemplary embodiment of the inventive concept. Repeat descriptions will be omitted.

Referring to FIG. 15, a multi-core processing device 200 includes a plurality of processor cores PC1, PC2, PC3, PC4, PC5, PC6, . . . , PC(N−1), and PCN, a scheduler 220, and a selector 230. The multi-core processing device 200 may further include a plurality of clusters CLU1, CLU2, . . . , CLUM, a domain definer 210, and a memory 240.

The multi-core processing device 200 of FIG. 15 may be substantially the same as the multi-processor system 100 of FIG. 2, except that the plurality of processors P1, P2, P3, P4, P5, P6, . . . , P(N−1), and PN in FIG. 2 are changed to the plurality of processor cores PC1, PC2, PC3, PC4, PC5, PC6, . . . , PC(N−1), and PCN in FIG. 15. The domain definer 210, the scheduler 220, the selector 230, and the memory 240 in FIG. 15 may be substantially the same as the domain definer 110, the scheduler 120, the selector 130, and the memory 140 in FIG. 2, respectively, and may operate the method according to the above-described exemplary embodiments of the inventive concept. In this example, the method according to exemplary embodiments of the inventive concept may be referred to as a method of operating the multi-core processing device.

In exemplary embodiments of the inventive concept, at least one of the domain definer 210 and the memory 240 may be disposed or located outside the multi-core processing device 200.

In exemplary embodiments of the inventive concept, at least a part of the domain definers 110 and 210, the schedulers 120 and 220, and the selectors 130 and 230 in FIGS. 2 and 15 may be implemented as hardware. For example, at least a part of the domain definers 110 and 210, the schedulers 120 and 220, and the selectors 130 and 230 may be included in a computer-based electronic system. In exemplary embodiments of the inventive concept, at least a part of the domain definers 110 and 210, the schedulers 120 and 220, and the selectors 130 and 230 in FIGS. 2 and 15 may be implemented as instructions or program routines (e.g., a software program). For example, the instructions or the program routines may be executed by a processing unit (e.g., at least one processor or processor core), and may be stored in a storage (e.g., the memory 140/240 or another external memory).

The inventive concept may be applied to various devices and systems that include a multi-processor system and/or a multi-core processing device. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

In the multi-processor system, the multi-core processing device, and the method of operating the multi-processor system according to exemplary embodiments of the inventive concept, the plurality of domains (e.g., three or more domains) may be defined based on the hierarchical domain structure, and each of the plurality of processors or processor cores may be included in at least one of the plurality of domains. In addition, the received task may be assigned to the specific domain and the specific processor or processor core based on the task assigning algorithm or the task packing algorithm (e.g., two-stage task assigning), and thus the tasks performed by the plurality of processors may be efficiently scheduled and managed. Accordingly, the performance and power consumption of the multi-processor system may be efficiently managed, and the multi-processor system may have improved or enhanced performance and reduced power consumption.

While the inventive concept has been particularly shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. A multi-processor system comprising:
a plurality of processors configured to perform at least one task; and
a plurality of domains including three or more domains, wherein each of the plurality of domains comprises a subset of the plurality of processors defined based on a hierarchical domain structure where each domain includes all lower level domains,
wherein each of the plurality of processors is included in at least one of the plurality of domains, and
wherein the at least one task is performed using at least one processor selected from among the plurality of processors in a first domain selected from among the plurality of domains, wherein the first domain is selected based on the first domain directly including a second domain after it is determined that the at least one task is unprocessable by a processor in the second domain based on a utilization of at least one task and a load of the second domain.

2. The multi-processor system of claim 1, wherein:
the plurality of processors includes a first processor, a second processor and a third processor,
the plurality of domains includes a first domain, a second domain and a third domain, and
the second domain includes the first domain, the third domain includes the second domain, the first domain includes the first processor, the second domain includes the first processor and the second processor, and the third domain includes the first processor, the second processor and the third processor.

3. The multi-processor system of claim 2, wherein one of the first domain, the second domain and the third domain correspond to one power domain.

4. The multi-processor system of claim 2, wherein each of the first domain, the second domain and the third domain corresponds to two or more different power domains, and wherein the two or more power domains overlap at least two of the plurality of domains.

5. The multi-processor system of claim 2, wherein:
the first processor, the second processor and the third processor are included in a first cluster, a second cluster and a third cluster, respectively, and
the first cluster, the second cluster and the third cluster are different from one another.

6. The multi-processor system of claim 2, wherein at least two of the first processor, the second processor and the third processor are included in a same cluster.

7. The multi-processor system of claim 1, further comprising:
a domain definer configured to define the hierarchical domain structure based on first information representing characteristics of the plurality of processors and second information associated with the plurality of domains, such that each of the plurality of processors is included in at least one of the plurality of domains.

8. The multi-processor system of claim 7, wherein the hierarchical domain structure is changeable by the domain definer in response to a user setting signal.

9. The multi-processor system of claim 7, further comprising:
a memory configured to store the first information, the second information and third information representing the hierarchical domain structure.

10. The multi-processor system of claim 1, wherein the one domain selected from among the plurality of domains comprises a current domain when the at least one task is unproces sable by the current domain.

11. The multi-processor system of claim 1, further comprising:
a scheduler configured to receive and manage the at least one task; and
a selector configured to select the one domain from among the plurality of domains based on states of the plurality of domains to assign the at least one task to the selected domain, and to select the at least one processor from among processors in the selected domain based on states of the processors in the selected domain to assign the at least one task to the selected processor, when the at least one task is received.

12. The multi-processor system of claim 11, wherein, when a first task is received, the selector is configured to:
check a state of a current domain among the plurality of domains,
assign the first task to the current domain when it is determined that the first task is proces sable by the current domain, and
assign the first task to a domain among the plurality of domains other than the current domain when it is determined that the first task is unproces sable by the current domain.

13. The multi-processor system of claim 12, wherein:
the state of the current domain includes at least one of utilization of the current domain and load of the current domain, and
the selector is configured to determine whether the first task is proces sable by the current domain based on at least one of the state of the current domain, utilization by the first task, and a priority of the first task.

14. The multi-processor system of claim 12, wherein the selector is configured to assign the first task to a smallest domain among the plurality of domains when the current domain does not exist.

15. The multi-processor system of claim 11, wherein, when a first task is received, the selector is configured to:
check the states of all of the plurality of domains, and
assign the first task to an optimized domain among the plurality of domains by which the first task is proces sable.

16. The multi-processor system of claim 11, wherein, when a first task is received and assigned to a first domain among the plurality of domains, the selector is configured to:
check states of first processors in the first domain among the plurality of processors, and
assign the first task to an idle processor having an idle state among the first processors.

17. The multi-processor system of claim 16, wherein the selector is configured to assign the first task to a processor having a smallest load among the first processors when all of the first processors have an active state.

18. A multi-processor system comprising:
a plurality of processors configured to perform at least one task; and
a plurality of domains including three or more domains, wherein each of the plurality of domains is defined based on a hierarchical domain structure where each domain includes all lower level domains,
wherein each of the plurality of processors is included in at least one of the plurality of domains, and
wherein the at least one task is performed using at least one processor selected from among the plurality of processors based on one domain selected from among the plurality of domains,
a scheduler configured to receive and manage the at least one task; and
a selector configured to select the one domain from among the plurality of domains based on states of the plurality of domains to assign the at least one task to the selected domain, and to select the at least one processor from among processors in the selected domain based on states of the processors in the selected domain to assign the at least one task to the selected processor, when the at least one task is received,
wherein the selector is configured to assign a first task to a processor firstly defined in a first domain among first processors when all of the first processors have an active state and a same load.

19. A multi-core processing device comprising:
a plurality of processor cores configured to perform at least one task; and
a plurality of domains including three or more domains, wherein each of the plurality of domains comprises a subset of the plurality of processors defined based on a hierarchical domain structure where each domain includes all lower level domains,
wherein each of the plurality of processor cores is included in at least one of the plurality of domains, and
wherein the at least one task is performed based on at least one processor core selected from among the plurality of processor cores in a first domain selected from among the plurality of domains, wherein the first domain is selected based on the first domain directly including a second domain after it is determined that the at least one task is unproces sable by a processor in the second domain based on a utilization of at least one task and a load of the second domain.

20. The multi-core processing device of claim 19, wherein:
the plurality of processor cores include a first processor core, a second processor core and a third processor core,
the plurality of domains include a first domain, a second domain and a third domain, and the hierarchical domain structure is defined such that the second domain includes the first domain, the third domain includes the second domain, the first domain includes the first processor core, the second domain includes the first processor core and the second processor core, and the third domain includes the first processor core, the second processor core and the third processor core.

* * * * *